United States Patent
Lin et al.

(10) Patent No.: US 11,936,924 B2
(45) Date of Patent: Mar. 19, 2024

(54) LIVE ROOM SETUP METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Ruiqiang Lin, Beijing (CN); Yawen Yang, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 0 days.

(21) Appl. No.: 18/060,551

(22) Filed: Nov. 30, 2022

(65) Prior Publication Data

US 2023/0098060 A1   Mar. 30, 2023

Related U.S. Application Data

(63) Continuation of application No. PCT/CN2021/128065, filed on Nov. 2, 2021.

(30) Foreign Application Priority Data

Nov. 3, 2020  (CN) .......................... 202011211276.6

(51) Int. Cl.
H04N 21/2187  (2011.01)
H04N 21/231   (2011.01)

(52) U.S. Cl.
CPC ... *H04N 21/2187* (2013.01); *H04N 21/23106* (2013.01)

(58) Field of Classification Search
CPC ......... H04N 21/2187; H04N 21/23106; H04N 21/258; H04N 21/431; H04N 21/4331; H04N 21/8586; H04N 21/26258
See application file for complete search history.

(56) References Cited

U.S. PATENT DOCUMENTS

| | | | |
|---|---|---|---|
| 2007/0078768 | A1 | 4/2007 | Dawson |
| 2014/0277639 | A1 | 9/2014 | Gomes-Casseres et al. |
| 2016/0277802 | A1* | 9/2016 | Bernstein ......... H04N 21/44213 |
| 2018/0167689 | A1 | 6/2018 | Qin et al. |
| 2019/0243873 | A1 | 8/2019 | Kabaghe et al. |
| 2020/0014641 | A1 | 1/2020 | Kwon et al. |

(Continued)

FOREIGN PATENT DOCUMENTS

| | | |
|---|---|---|
| CN | 104320680 A | 1/2015 |
| CN | 104394432 A | 3/2015 |

(Continued)

OTHER PUBLICATIONS

Search Report dated Jan. 27, 2022 for PCT Application No. PCT/CN2021/128065, English Translation (5 pages).

(Continued)

*Primary Examiner* — Adil Ocak

(57) ABSTRACT

Provided are a method and an apparatus for creating a live room, an electronic device, and a storage medium. The method for creating a live room includes: receiving a trigger instruction of a preset creation identifier; acquiring, according to the trigger instruction, live information associated with the preset creation identifier; and sending the live information to a server such that the server creates a target live room based on the live information.

17 Claims, 8 Drawing Sheets

(56) References Cited

U.S. PATENT DOCUMENTS

2022/0078221 A1* 3/2022 Zhang .................. H04L 65/1069
2022/0141500 A1* 5/2022 Du ........................ H04N 21/488
                                                            725/116

FOREIGN PATENT DOCUMENTS

| | | |
|---|---|---|
| CN | 106331826 A | 1/2017 |
| CN | 106454392 A | 2/2017 |
| CN | 108235042 A | 6/2018 |
| CN | 110418149 A | 11/2019 |
| CN | 110536147 A | 12/2019 |
| CN | 111405303 A | 7/2020 |
| CN | 306033396 S | 9/2020 |
| CN | 112383787 A | 2/2021 |
| IN | 107333152 A | 11/2017 |
| JP | 2003036219 A | 2/2003 |
| JP | 2017123138 A | 7/2017 |
| JP | 2018026152 A | 2/2018 |

OTHER PUBLICATIONS

First Office Action dated Nov. 27, 2022 for CN Application No. 202011211276.6, English Translation (13 pages).
EP Search Report dated Nov. 3, 2023 in EP Appl. No. 21888537.4 (4 pages).
Notice of Reasons for Refusal dated Jan. 23, 2024 in JP Appl. No. 2022-573671, English translation (8 pages).

\* cited by examiner

LIVE ROOM SETUP METHOD AND APPARATUS, ELECTRONIC DEVICE, AND STORAGE MEDIUM

CROSS-REFERENCE TO RELATED APPLICATIONS

This is a continuation of International Patent Application No. PCT/CN2021/128065, filed on Nov. 2, 2021, which claims priority to Chinese Patent Application No. 202011211276.6 filed on Nov. 3, 2020, the disclosures of which are incorporated herein by reference in their entireties.

TECHNICAL FIELD

The present disclosure relates to the field of computer technology, for example, a method and an apparatus for creating a live room, an electronic device, and a storage medium.

BACKGROUND

With the development of Internet technology and terminal technology, watching live videos of live streamers in live rooms has become part of people's daily lives. In the related art, a live application client may be installed in a terminal (for example, a mobile phone), a live streamer user may create a live room through this type of application client, and a viewer user may watch a live room of a specific live streamer through this type of application client.

Each time the live streamer user creates a live room through this type of application client, regardless of the content of a live stream, the live streamer user needs to actively input some necessary data such as the name of the live room, the cover image of the live room, the start time of the live stream, and a horizontal screen or a vertical screen. Then, the preceding necessary data is sent to a server by the application client. Based on the preceding necessary data, the server generates the live room and an identifier corresponding to the live room and displays the identifier on the application client. The live streamer user enters a live environment through this identifier, and the viewer user enters the live room of the live streamer according to this identifier to watch the live stream.

Thus, it can be seen that the process is relatively cumbersome where the live streamer user creates the live room, which increases the difficulty for the live streamer user to perform a video live stream and has the problem of certain traffic consumption.

SUMMARY

The present disclosure provides a method and an apparatus for creating a live room, an electronic device, and a storage medium, which simplifies an operation process where a user creates the live room and improves efficiency in the creation of the live room.

A method for creating a live room is provided. The method includes the steps described below.

A trigger instruction of a preset creation identifier is received.

Live stream information associated with the preset creation identifier is acquired according to the trigger instruction.

The live information is sent to a server such that the server creates a target live room based on the live information.

An apparatus for creating a live room is further provided. The apparatus includes a first reception module, an acquisition module, and a sending module.

The first reception module is configured to receive a trigger instruction of a preset creation identifier.

The acquisition module is configured to acquire, according to the trigger instruction, live information associated with the preset creation identifier.

The sending module is configured to send live information to a server, wherein the live information is used for the server to create a target live room.

An electronic device is further provided.

The electronic device includes one or more processors and a storage apparatus.

The storage apparatus is configured to store one or more programs.

When executed by the one or more processors, the one or more programs cause the one or more processors to implement the method for creating a live room according to any one of embodiments of the present disclosure.

A non-transitory storage medium including computer-executable instructions is further provided. When executed by a computer processor, the computer-executable instructions are used for performing the method for creating a live room according to any one of embodiments of the present disclosure.

DETAILED DESCRIPTION

Embodiments of the present disclosure are described hereinafter with reference to the drawings. The drawings illustrate some embodiments of the present disclosure, but the present disclosure may be implemented in various manners and should not be construed as limited to the embodiments set forth herein. The drawings and embodiments of the present disclosure are illustrative and are not intended to limit the scope of the present disclosure.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

Concepts such as "first" and "second" in the present disclosure are used to distinguish between apparatuses, between modules, or between units and are not intended to limit the order or mutual dependence of the functions performed by these apparatuses, modules, or units.

"One" and "multiple" mentioned in the present disclosure are not limiting but illustrative and are construed as "one or more" unless otherwise specified in the context.

Embodiment One

Figure 1:
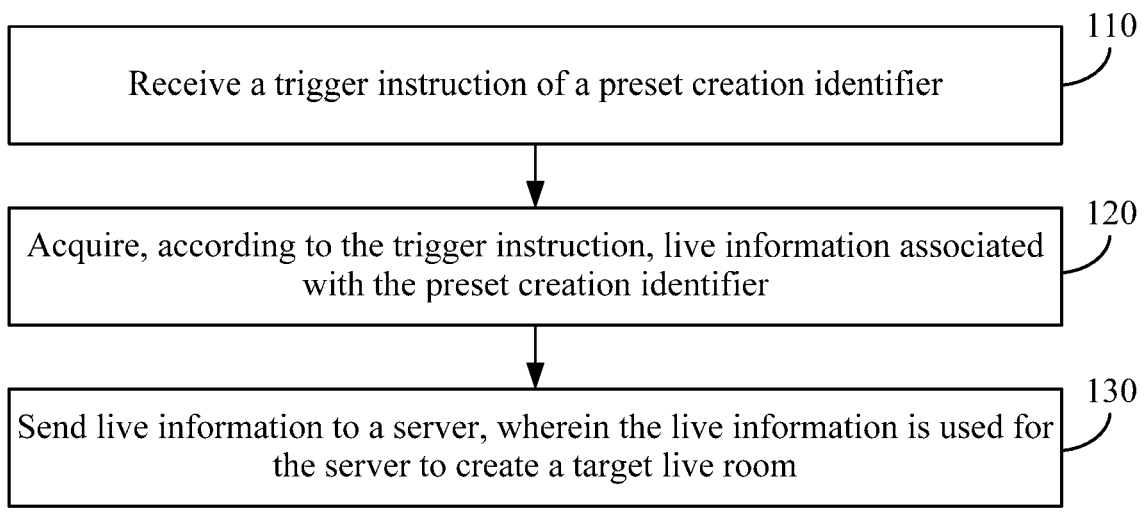
FIG. 1 is a flowchart of a method for creating a live room according to embodiment one of the present disclosure.

FIG. 1 is a flowchart of a method for creating a live room according to embodiment one of the present disclosure. The method is applicable to an application scenario in which the live room is created on a live streamer terminal. The method may be performed by an apparatus for creating a live room. The apparatus may be implemented by software and/or hardware and is typically integrated into a live client.

As shown in FIG. 1, the method for creating a live room provided by this embodiment includes the steps described below.

In step 110, a trigger instruction of a preset creation identifier is received.

The preset creation identifier may be an interaction icon or an interaction button displayed at a first associated position in a display region for a historical live room, for example, a "copy" interaction button, a "recreate" interaction button, or the like. The historical live room is a historically created live room. The interaction icon is displayed at the first associated position in the display region for the historically created live room such that when a live streamer user wants to recreate the same live room, the live streamer user may trigger the interaction icon to implement one-click creation, which greatly simplifies an operation process where the live streamer user creates the live room and improves efficiency in the creation of the live room.

Figure 2:
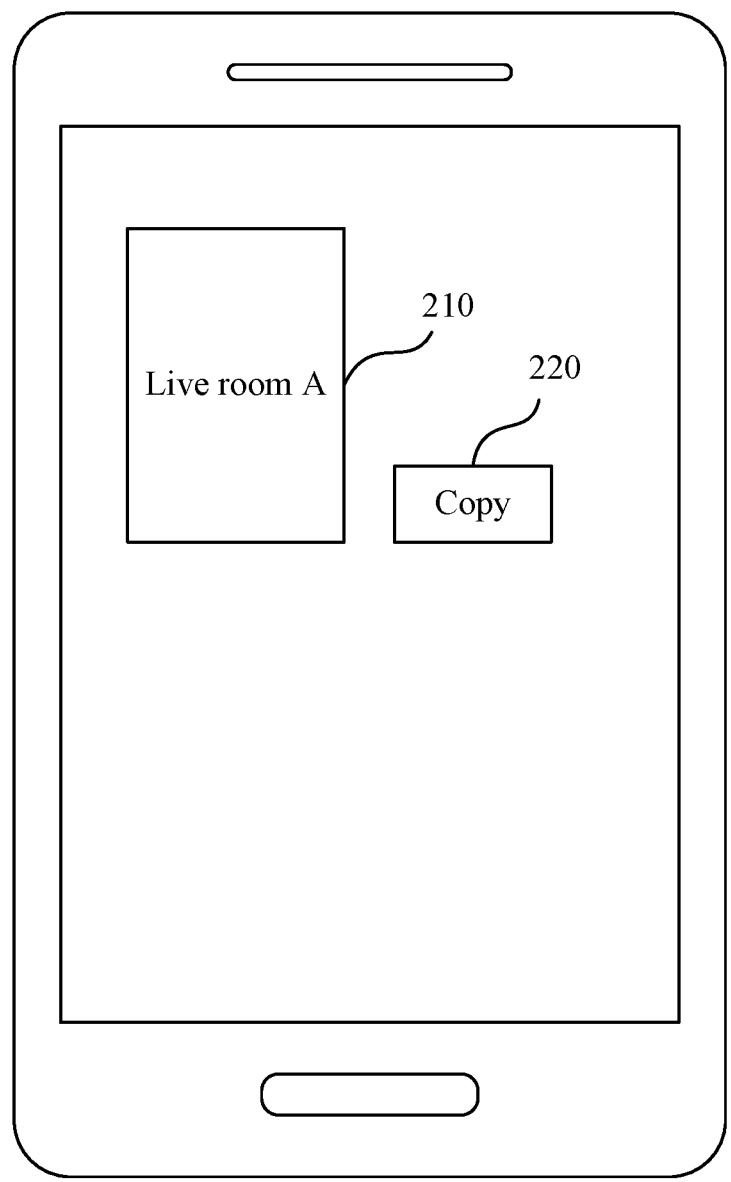
FIG. 2 is a schematic diagram showing a display of a live room page on a live client according to embodiment one of the present disclosure.

Reference may be made to FIG. 2 which is a schematic diagram showing a display of a live room page on a live client. A live room A210 is previously created by the live streamer user. A preset creation identifier 220 is displayed at a first associated position of the live room A210, which may be the "copy" interaction button. When the live streamer user wants to recreate the same live room as the live room A, the live streamer user may trigger the "copy" interaction button 220 to implement the one-click creation.

In step 120, live information associated with the preset creation identifier is acquired according to the trigger instruction.

The live information includes at least one of: the name of the live room, the uniform resource locator (URL) of the cover image of the live room, a horizontal screen/a vertical screen, a live definition, and a live manner. When the trigger instruction is received, the live information associated with the preset creation identifier is acquired, where the live information is information acquired when the historical live room associated with the preset creation identifier is created for the first time. Using FIG. 2 as an example, when the trigger instruction of the "copy" interaction button is received, live information of the live room A is acquired, where the live information is actively input by the live streamer user when the live room A is created for the first time. In order that the operation process is simplified where the live streamer user creates the live room and the case is avoided where the live streamer user is required to actively input the live information each time the live room is created, in the technical solution provided by this embodiment, the preset creation identifier is displayed at the first associated position in the display region for the historical live room such that when the user triggers the preset creation identifier, the live information collected when the historical live room is created for the first time is automatically acquired, thereby achieving the object of simplifying the creation of the live room by the live streamer user.

The step in which the live information associated with the preset creation identifier is acquired according to the trigger instruction includes the step described below.

Cached live information of the historical live room is acquired.

When a display identifier of the historical live room is displayed, the client acquires the live information of the historical live room from a server and caches the live information of the historical live room.

In step 130, the live information is sent to the server such that the server creates a target live room based on the live information.

After receiving the live information, the server creates the target live room based on the live information, generates a display identifier of the target live room, and displays the display identifier of the target live room on the client. When it is time for a live stream, the live streamer user clicks the display identifier of the target live room to enter a live environment and perform the live stream, and a viewer user clicks the display identifier of the target live room to enter the live room and can watch the content of the live stream performed by the live streamer. The display identifier is typically the cover of the live room, where the cover includes some information introducing the content of the live stream such as the time of the live stream, a topic of the live stream, the avatar of the live streamer, and personal information of the live streamer so that it is convenient for the viewer user to learn about this target live room in time, rapidly find a live room in which the viewer user is interested, and watch the content of the live stream.

The live information includes the uniform resource locator (URL) of the cover image of the live room rather than the cover image of the live room. The uniform resource locator (URL) has a much smaller amount of data than the image. Therefore, the uniform resource locator (URL) of the cover image of the live room can be uploaded with a higher speed than the cover image of the live room and certain upload traffic can be saved, thereby improving the efficiency in the creation of the live room.

According to the technical solution of the embodiment of the present disclosure, the preset creation identifier is displayed at the first associated position in the display region for the historical live room such that when the live streamer user wants to create the same live room as the historical live room, the live streamer user may trigger the preset creation identifier to implement the one-click creation, which greatly simplifies the operation process where the live streamer user creates the live room and improves the efficiency in the creation of the live room. When the trigger instruction of the preset creation identifier is received, the live information associated with the preset creation identifier is automatically acquired according to the trigger instruction, and the live streamer user is not required to input the live information manually, thereby achieving the object of simplifying the operation process where the user creates the live room. The live information uploaded to the server includes the uniform resource locator (URL) of the cover image of the live room rather than the cover image of the live room, thereby achieving the object of saving the certain upload traffic, improving the upload speed, and improving the efficiency in the creation of the live room.

Embodiment Two

Figure 3:
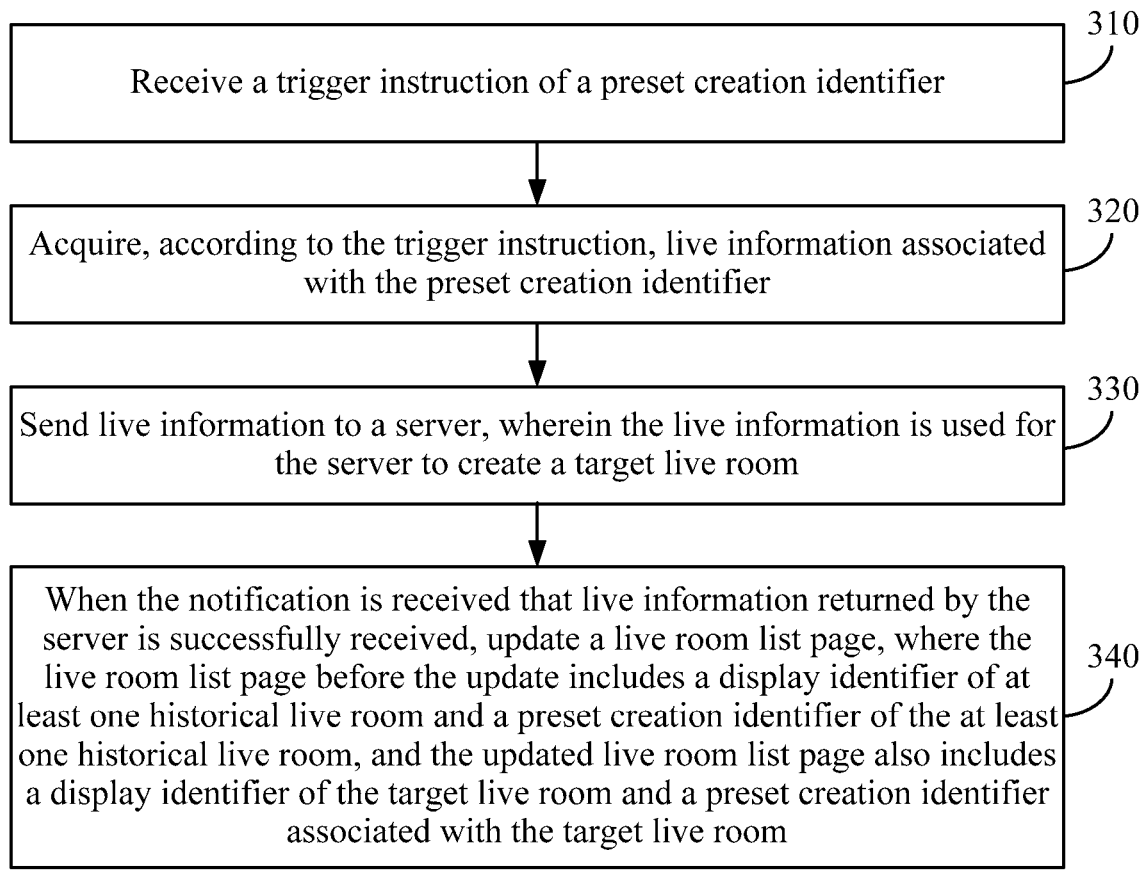
FIG. 3 is a flowchart of a method for creating a live room according to embodiment two of the present disclosure.

FIG. 3 is a flowchart of a method for creating a live room according to embodiment two of the present disclosure. Based on the preceding embodiment, the solution for creating the live room is described in this embodiment. After the live information is sent to the server, the step is added in which a live room list page of the client is updated, so as to achieve the object of displaying the newly created target live room. Thus, it is convenient for the user to notice the newly created target live room in time. Explanations which are the same as or similar to the explanations in the preceding embodiment are not repeated in this embodiment.

As shown in FIG. 3, the method includes the steps described below.

In step 310, a trigger instruction of a preset creation identifier is received.

In step 320, live information associated with the preset creation identifier is acquired according to the trigger instruction.

In step 330, the live information is sent to the server such that the server creates a target live room based on the live information.

In step 340, when the notification is received that live information returned by the server is successfully received, a live room list page is updated, where the live room list page before the update includes a display identifier of at least one historical live room and a preset creation identifier of the at least one historical live room, and the updated live room list page also includes a display identifier of the target live room and a preset creation identifier associated with the target live room.

Figure 4:
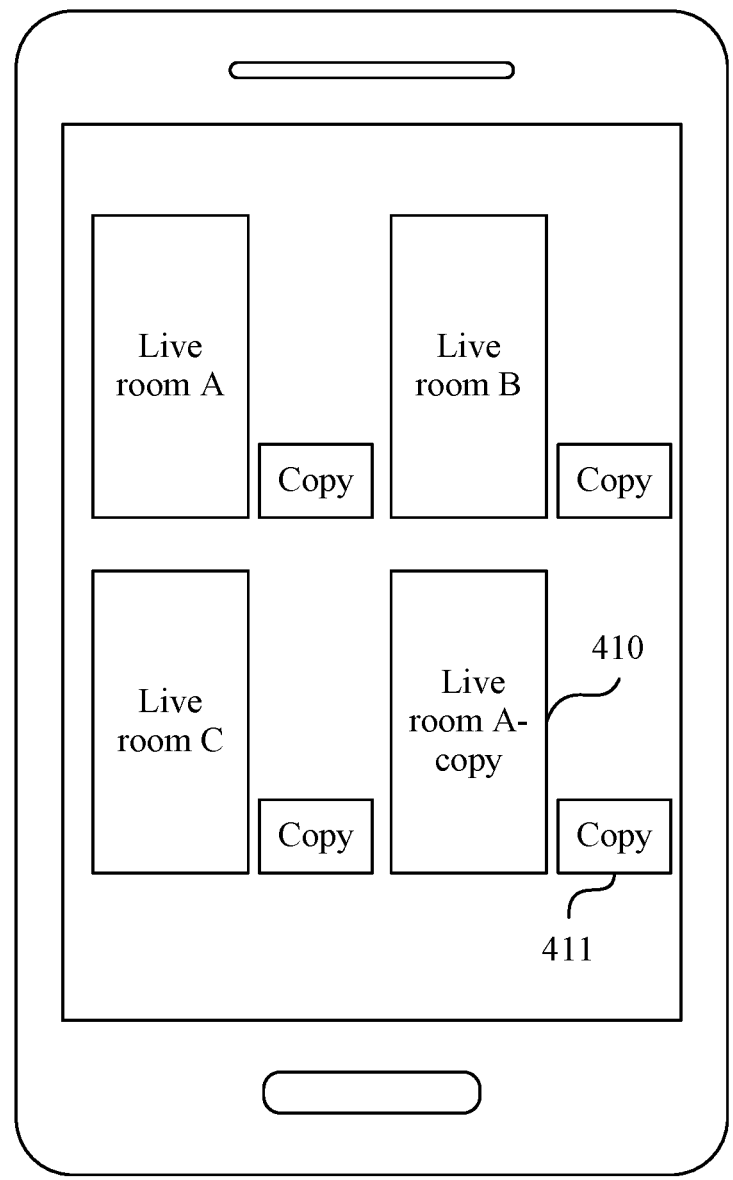
FIG. 4 is a schematic diagram of an updated live room list page according to embodiment two of the present disclosure.
Figure 5:
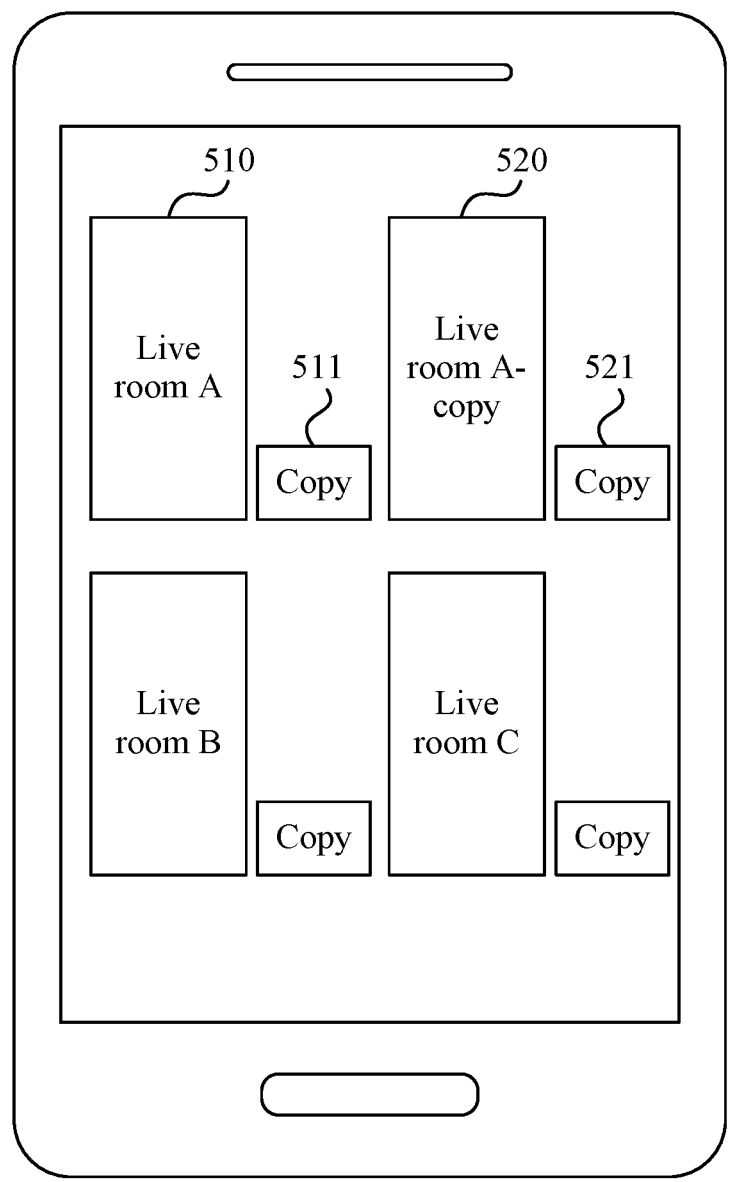
FIG. 5 is a schematic diagram of another updated live room list page according to embodiment two of the present disclosure.
Figure 6:
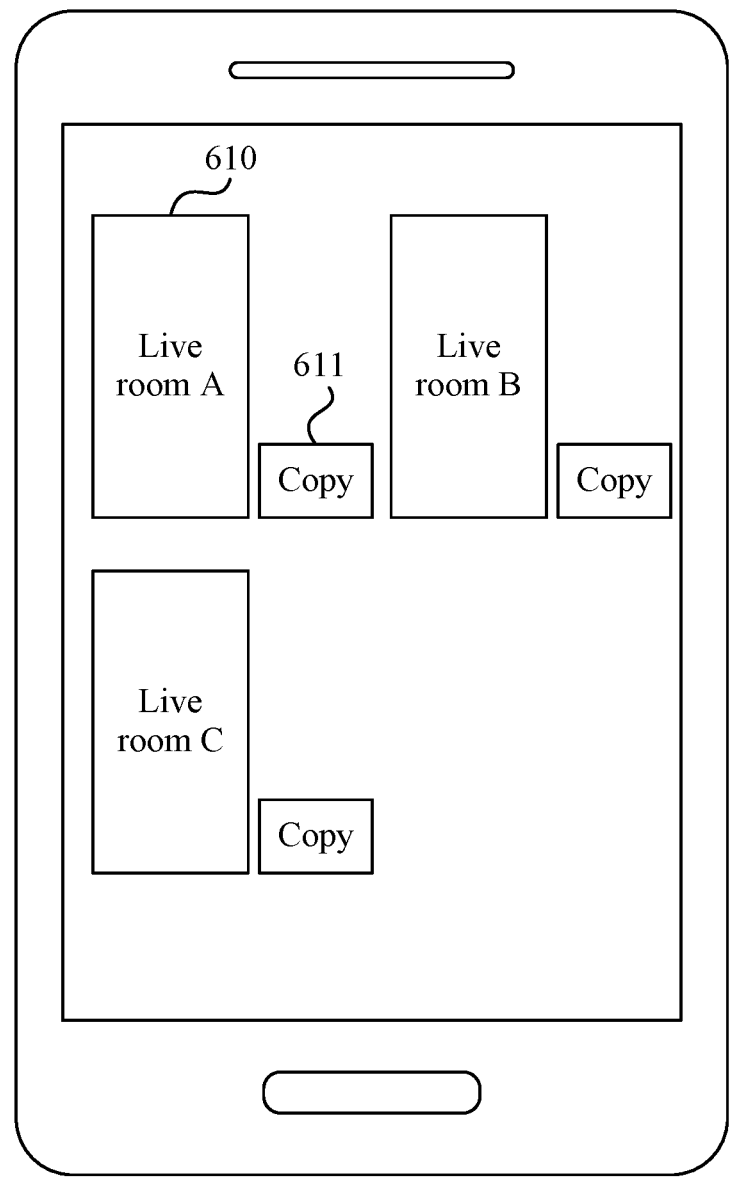
FIG. 6 is a schematic diagram of a live room list page before an update according to embodiment two of the present disclosure.

Reference may be made to FIGS. 4 and 5 which are schematic diagrams of updated live room list pages and FIG. 6 which is a schematic diagram of a live room list page before an update. The live room list page before the update includes a display identifier 610 of at least one historical live room and a preset creation identifier 611 (which may be a "copy" interaction button) associated with the display identifier 610. The updated live room list page (reference may be made to FIG. 5) includes a display identifier 510 of the historical live room and a preset creation identifier 511 of the historical live room and also includes a display identifier 520 of the newly created target live room and a preset creation identifier 521 associated with the target live room.

The step in which the live room list page is updated includes the step described below.

The display identifier of the target live room is added to a blank position of the live room list page.

Alternatively, the display identifier of the target live room is added to a second associated position in a display region for the historical live room. The display identifier of the target live room and the display identifier of the historical live room include the same content, for example, the same cover of the live room or the same name of the live room.

Referring to FIGS. 4 and 5 which are the schematic diagrams of the updated live room list pages, in FIG. 4, a display identifier 410 of the target live room is added to the blank position (which may be the end of the page) of the live room list page, and in FIG. 5, the display identifier 520 of the target live room (the target live room is correspondingly a copy of a live room A) is added to a second associated position in a display region for the historical live room 510 (for example, the live room A), and a live room previously displayed at the second associated position is moved to the right sequentially or moved to the next row and arranged sequentially. For example, as shown in FIG. 6 which is the schematic diagram of the live room list page before the update, the identifier of a live room B is displayed at the second associated position in the display region for the historical live room 510, and in the updated live room list page, the identifier of the live room B is displayed in the next row, the identifier of a live room C is moved to the right for a display, and the display region for the live room B is occupied by the newly created target live room (the copy of the live room A).

The step in which the live room list page is updated further includes the step in which the preset creation identifier associated with the target live room is displayed at the second associated position of the display identifier of the target live room. It can be seen from FIGS. 4 and 5 that preset creation identifiers 411 or 521 (which may be the "copy" interaction button) are also displayed at the first associated position of the newly created target live room 410 or the first associated position of the newly created target live room 520. The user clicks the "copy" interaction button 411 or 521 such that the copy of the live room A can also be created rapidly.

After the live room list page is updated, the method further includes the step described below.

When a trigger instruction of the display identifier of the target live room is received, a live interface is displayed.

Figure 7:
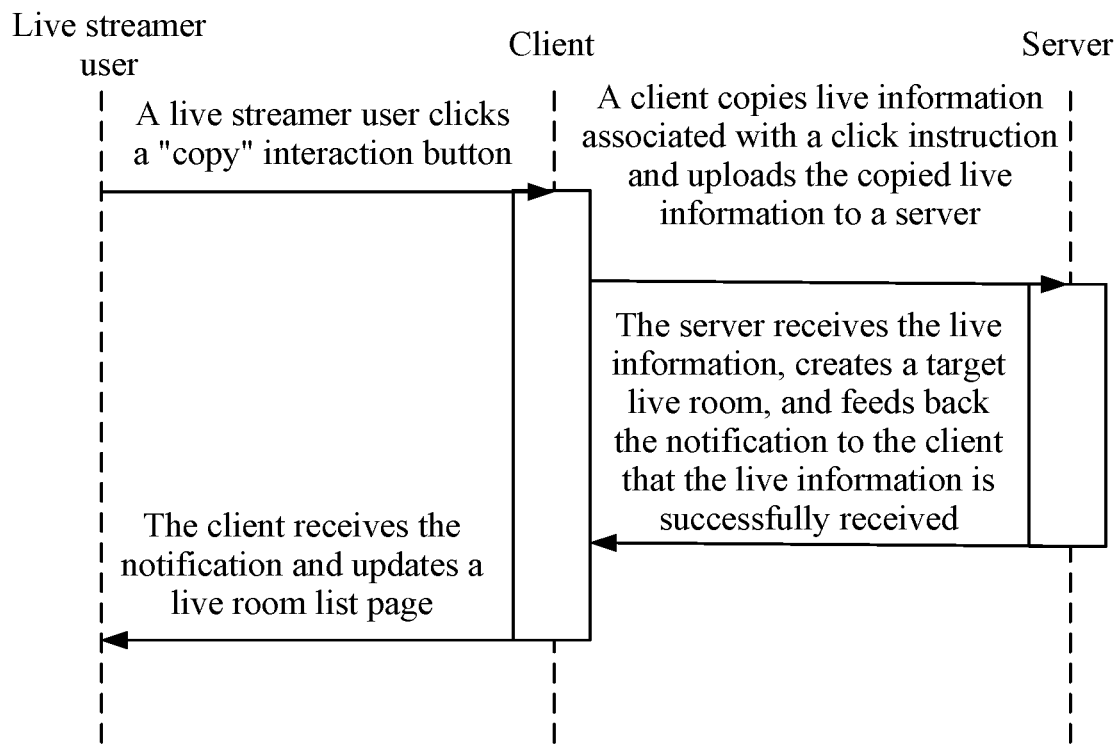
FIG. 7 is a flowchart of another method for creating a live room according to embodiment two of the present disclosure.

Referring to FIG. 7 which is a flowchart of another method for creating a live room, the method includes the following steps: a live streamer user clicks a "copy" interaction button (that is, a preset creation identifier); a client receives a click instruction, copies live information associated with the click instruction, and uploads the copied live information to a server; the server receives the live information, creates a target live room, and feeds back the notification to the client that the live information is successfully received; and the client receives the notification and updates a live room list page for the live streamer user to view.

According to the technical solution of the embodiment of the present disclosure, based on the preceding embodiment, after the live information is sent to the server, the step is added in which the live room list page of the client is updated, so as to achieve the object of displaying the newly created target live room. Thus, it is convenient for the user to notice the newly created target live room in time. The display identifier of the target live room may be added to the blank position of the live room, or the display identifier of the target live room may be added to the second associated position of the display region for the historical live room such that the target live room is explicitly identified as the copy of the historical live room. Thus, it is convenient for the live streamer user to manage live rooms of the live streamer user, and it is convenient for a viewer user to rapidly find a live room in which the viewer user is interested.

Embodiment Three

Figure 8:
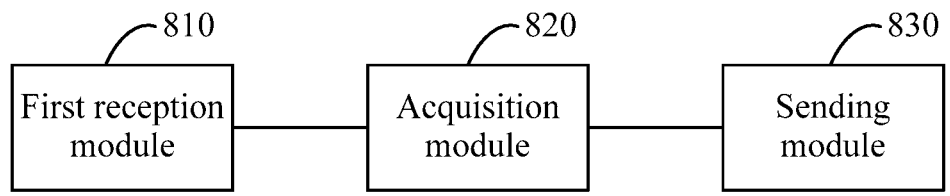
FIG. 8 is a structure diagram of an apparatus for creating a live room according to embodiment three of the present disclosure.

FIG. 8 is a structure diagram of an apparatus for creating a live room according to embodiment three of the present disclosure. The apparatus includes a first reception module 810, an acquisition module 820, and a sending module 830.

The first reception module 810 is configured to receive a trigger instruction of a preset creation identifier. The acquisition module 820 is configured to acquire, according to the trigger instruction, live information associated with the preset creation identifier. The sending module 830 is configured to send the live information to a server such that the server creates a target live room based on the live information.

On the basis of the preceding technical solutions, the preset creation identifier is displayed at a first associated position in a display region for a historical live room.

The historical live room is a historically created live room.

On the basis of the multiple preceding technical solutions, the acquisition module 820 is configured to acquire cached live information of the historical live room.

When a display identifier of the historical live room is displayed, live information of the historical live room is acquired from the server and cached.

On the basis of the multiple technical solutions described above, the apparatus further includes an update module which is configured to: after the live information is sent to the server, update a live room list page when the notification is received that live information returned by the server is successfully received, where the live room list page before the update includes a display identifier of at least one historical live room and a preset creation identifier of the at least one historical live room, and the updated live room list page also includes a display identifier of the target live room and a preset creation identifier associated with the target live room.

On the basis of the multiple technical solutions described above, the update module includes an addition unit which is configured to add the display identifier of the target live room to a blank position of the live room list page.

Alternatively, the addition unit which is configured to add the display identifier of the target live room to a second associated position in the display region for the historical live room.

On the basis of the multiple technical solutions described above, the display identifier of the target live room and a display identifier of the historical live room include the same content.

The update module is further configured to display, at the second associated position of the display identifier of the target live room, the preset creation identifier associated with the target live room.

On the basis of the multiple technical solutions described above, the apparatus further includes a display module which is configured to: after the live room list page is updated, display a live interface when a trigger instruction of the display identifier of the target live room is received.

On the basis of the multiple technical solutions described above, the live information includes at least one of: the name of the live room, the uniform resource locator (URL) of the cover image of the live room, a horizontal screen/a vertical screen, a live definition, and a live manner.

According to the technical solution of the embodiment of the present disclosure, the preset creation identifier is displayed at the first associated position in the display region for the historical live room such that when the live streamer user wants to create the same live room as the historical live room, the live streamer user may trigger the preset creation identifier to implement the one-click creation, which greatly simplifies the operation process where the live streamer user creates the live room and improves the efficiency in the creation of the live room. When the trigger instruction of the preset creation identifier is received, the live information associated with the preset creation identifier is automatically acquired according to the trigger instruction, and the live streamer user is not required to input the live information manually, thereby achieving the object of simplifying the operation process where the user creates the live room. The live information uploaded to the server includes the uniform resource locator (URL) of the cover image of the live room rather than the cover image of the live room, thereby achieving the object of saving the certain upload traffic, improving the upload speed, and improving the efficiency in the creation of the live room.

The apparatus for creating a live room provided by the embodiment of the present disclosure may perform the method for creating a live room provided by any embodiment of the present disclosure and has functional modules to perform the method and effects corresponding to the method.

Units and modules included in the preceding apparatus are divided according to function logic. These units and modules may also be divided in other manners as long as the corresponding functions can be implemented. Moreover, names of these function units are used for distinguishing between these function units and not intended to limit the scope of the embodiment of the present disclosure.

Embodiment Four

Figure 9:
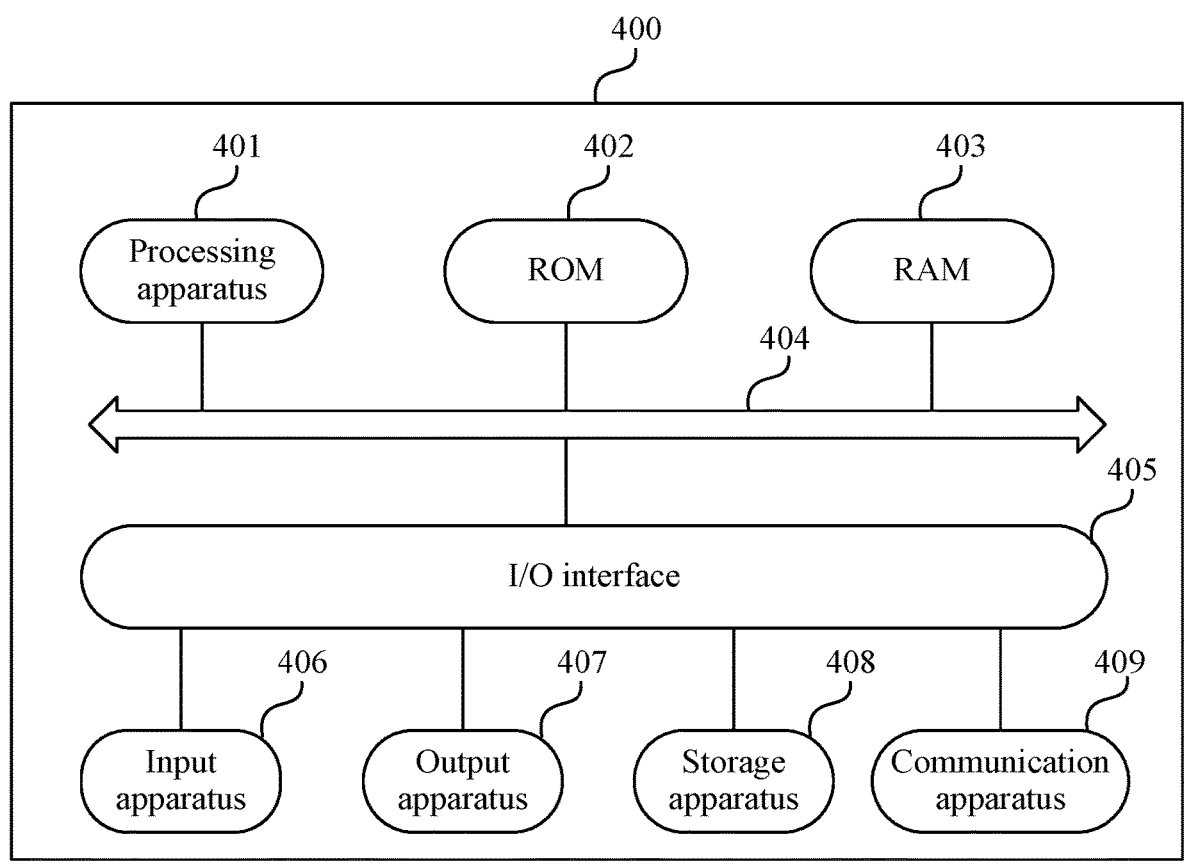
FIG. 9 is a structure diagram of an electronic device according to embodiment four of the present disclosure.

Referring to FIG. 9, FIG. 9 is a structure diagram of an electronic device 400 (such as a terminal device or a server in FIG. 9) applicable to implementing the embodiment of the present disclosure. The terminal device in the embodiment of the present disclosure may include mobile terminals such as a mobile phone, a laptop, a digital broadcast receiver, a personal digital assistant (PDA), a portable Android device (PAD), a portable multimedia player (PMP), and a vehicle-mounted terminal (for example, a vehicle-mounted navigation terminal) and fixed terminals such as a digital television (TV) and a desktop computer. The electronic device shown in FIG. 9 is merely an example and should not impose any limitation to the function and usage scope of the embodiment of the present disclosure.

As shown in FIG. 9, the electronic device 400 may include a processing apparatus 401 (such as a central processing unit and a graphics processing unit). The processing apparatus 401 may perform various appropriate actions and processing according to a program stored in a read-only memory (ROM) 402 or a program loaded into a random-access memory (RAM) 403 from a storage apparatus 408. The RAM 403 also stores various programs and data required for the operation of the electronic device 400. The processing apparatus 401, the ROM 402, and the RAM 403 are connected to each other via a bus 404. An input/output (I/O) interface 405 is also connected to the bus 404.

The following apparatuses may be connected to the I/O interface 405: including an input apparatus 406 such as a touch screen, a touch pad, a keyboard, a mouse, a camera, a microphone, an accelerometer, and a gyroscope; an output apparatus 407 such as a liquid crystal display (LCD), a speaker, and a vibrator; the storage apparatus 408 such as a magnetic tape and a hard disk; and a communication apparatus 409. The communication apparatus 409 may allow the electronic device 400 to perform wireless or wired communication with other devices to exchange data. Although FIG. 9 shows the electronic device 400 having various apparatuses, but it is not required to implement or have all the shown apparatuses. Alternatively, more or fewer apparatuses may be implemented or provided.

According to the embodiments of the present disclosure, the process described above with reference to the flowchart may be implemented as a computer software program. For example, a computer program product is included in the embodiments of the present disclosure. The computer program product includes a computer program carried on a non-transitory computer-readable medium. The computer program includes program codes for performing the method shown in the flowchart. In such embodiments, the computer program may be downloaded and installed from a network through the communication apparatus 409, installed from the storage apparatus 408, or installed from the ROM 402. When the computer program is executed by the processing apparatus 401, the preceding functions defined in the methods in the embodiments of the present disclosure are implemented.

The terminal provided by the embodiment of the present disclosure belongs to the same inventive concept as the method for creating a live room provided by the preceding embodiments. For the technical details not described in the embodiment of the present disclosure, reference may be made to the preceding embodiments, and the embodiment of the present disclosure has the same effects as the preceding embodiments.

Embodiment Five

An embodiment of the present disclosure provides a computer storage medium storing a computer program which, when executed by a processor, implements the method for creating a live room provided by the preceding embodiments.

The preceding computer-readable medium in the present disclosure may be a computer-readable signal medium or a computer-readable storage medium or any combination thereof. The computer-readable storage medium may be an electronic, magnetic, optical, electromagnetic, infrared, or semiconductor system, apparatus, or device, or any combination thereof. The computer-readable storage medium may include: an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. The storage medium may be a non-transitory storage medium. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted on any suitable medium, including a wire, an optical cable, a radio frequency (RF), or any suitable combination thereof.

In some embodiments, the client and the server may communicate using any network protocol currently known or to be researched and developed in the future such as the HyperText Transfer Protocol (HTTP), and may communicate (via a communication network) and interconnect with digital data in any form or medium. Examples of the communication network include a Local Area Network (LAN), a Wide Area Network (WAN), an inter-network (for example, the Internet), a peer-to-peer network (for example, an ad hoc network), and any network currently known or to be researched and developed in the future.

The computer-readable medium may be included in the electronic device or may exist alone without being assembled into the electronic device.

The preceding computer-readable medium carries one or more programs which, when executed by the electronic device, cause the electronic device to implement the functions described below.

A trigger instruction of a preset creation identifier is received.

Live stream information associated with the preset creation identifier is acquired according to the trigger instruction.

The live information is sent to a server such that the server creates a target live room based on the live information.

Computer program codes for performing the operations in the present disclosure may be written in one or more programming languages or a combination thereof. The preceding one or more programming languages include object-oriented programming languages such as Java, Smalltalk, and C++, as well as conventional procedural programming languages such as "C" or similar programming languages. The program codes may be executed entirely on a user computer, partly on a user computer, as a stand-alone software package, partly on a user computer and partly on a remote computer, or executed entirely on a remote computer or a server. In the scenario involving the remote computer, the remote computer may be connected to the user computer through any type of network, including a LAN or a WAN, or the connection may be made to an external computer (for example, through the Internet using an Internet service provider).

The flowcharts and block diagrams in the drawings show possible architectures, functions, and operations of the system, method, and computer program product according to multiple embodiments of the present disclosure. In this regard, each block in the flowcharts or block diagrams may represent a module, a program segment, or part of codes which includes one or more executable instructions for implementing specified logical functions. In some alternative implementations, the functions noted in the blocks may occur in an order different from that noted in the drawings. For example, two blocks shown in succession may, in fact, be executed substantially in parallel or in a reverse order, which depends on the functions involved. Each block of the block diagrams and/or flowcharts, and combinations of blocks in the block diagrams and/or flowcharts may be implemented by special purpose hardware-based systems which perform specified functions or operations, or may be implemented by a combination of special purpose hardware and computer instructions.

The units involved in the embodiment of the present disclosure may be implemented by software or hardware. The name of a unit is not intended to limit the unit in a circumstance. For example, an editable content display unit may also be described as an "editing unit".

The functions described above herein may be executed, at least partially, by one or more hardware logic components. For example, available exemplary types of hardware logic components include: a Field Programmable Gate Array (FPGA), an Application Specific Integrated Circuit (ASIC), Application Specific Standard Parts (ASSP), a System-on-Chip (SOC), a Complex Programmable Logic Device (CPLD), and the like.

In the context of the present disclosure, a machine-readable medium may be a tangible medium which may include or store a program which is used by or used in conjunction with an instruction execution system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination thereof. The machine-readable storage medium includes an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

According to one or more embodiments of the present disclosure, example one provides a method for creating a live room. The method includes the steps described below.

A trigger instruction of a preset creation identifier is received.

Live stream information associated with the preset creation identifier is acquired according to the trigger instruction.

The live information is sent to a server such that the server creates a target live room based on the live information.

According to one or more embodiments of the present disclosure, example two provides a method for creating a live room. Optionally, the preset creation identifier is displayed at a first associated position in a display region for a historical live room.

The historical live room is a historically created live room.

According to one or more embodiments of the present disclosure, example three provides a method for creating a live room. Optionally, the step in which the live information associated with the preset creation identifier is acquired according to the trigger instruction includes the step described below.

Cached live information of the historical live room is acquired.

When a display identifier of the historical live room is displayed, live information of the historical live room is acquired from the server and cached.

According to one or more embodiments of the present disclosure, example four provides a method for creating a live room. Optionally, after the live information is sent to the server, the method further includes the step described below.

When the notification is received that live information returned by the server is successfully received, a live room list page is updated, where the live room list page before the update includes a display identifier of at least one historical live room and a preset creation identifier of the at least one historical live room, and the updated live room list page also includes a display identifier of the target live room and a preset creation identifier associated with the target live room.

According to one or more embodiments of the present disclosure, example five provides a method for creating a live room. Optionally, the step in which the live room list page is updated includes the step described below.

The display identifier of the target live room is added to a blank position of the live room list page.

Alternatively, the display identifier of the target live room is added to a second associated position in the display region for the historical live room.

According to one or more embodiments of the present disclosure, example six provides a method for creating a live room. Optionally, the case described below is further included.

The display identifier of the target live room and a display identifier of the historical live room include the same content.

According to one or more embodiments of the present disclosure, example seven provides a method for creating a live room. The step in which the live room list page is updated further includes the step described below.

The preset creation identifier associated with the target live room is displayed at the second associated position of the display identifier of the target live room.

According to one or more embodiments of the present disclosure, example eight provides a method for creating a live room. Optionally, after the live room list page is updated, the method further includes the step described below.

When a trigger instruction of the display identifier of the target live room is received, a live interface is displayed.

According to one or more embodiments of the present disclosure, example nine provides a method for creating a live room. Optionally, the live information includes at least one of: the name of the live room, the uniform resource locator (URL) of the cover image of the live room, a horizontal screen/a vertical screen, a live definition, and a live manner.

According to one or more embodiments of the present disclosure, example ten provides an apparatus for creating a live room. The apparatus includes a first reception module, an acquisition module, and a sending module.

The first reception module is configured to receive a trigger instruction of a preset creation identifier.

The acquisition module is configured to acquire, according to the trigger instruction, live information associated with the preset creation identifier.

The sending module is configured to send the live information to a server such that the server creates a target live room based on the live information.

According to one or more embodiments of the present disclosure, example eleven provides an electronic device.

The electronic device includes one or more processors and a storage apparatus.

The storage apparatus is configured to store one or more programs.

When executed by the one or more processors, the one or more programs cause the one or more processors to implement the method for creating a live room described below.

A trigger instruction of a preset creation identifier is received.

Live stream information associated with the preset creation identifier is acquired according to the trigger instruction.

The live information is sent to a server such that the server creates a target live room based on the live information.

According to one or more embodiments of the present disclosure, example twelve provides a storage medium including computer-executable instructions. When executed by a computer processor, the computer-executable instructions are used for performing the method for creating a live room described below.

A trigger instruction of a preset creation identifier is received.

Live stream information associated with the preset creation identifier is acquired according to the trigger instruction.

The live information is sent to a server such that the server creates a target live room based on the live information.

In addition, although multiple operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable sub-combination.

What is claimed is:

1. A method for creating a live room, comprising:
   receiving a trigger instruction of a first preset creation identifier;
   acquiring, according to the trigger instruction, live information associated with the first preset creation identifier; and
   sending live information to a server, wherein the live information is used for the server to create a target live room;
   wherein the first preset creation identifier is an interaction icon or an interaction button displayed at a first associated position in a display region for a historical live room;
   wherein the historical live room is a historically created live room; and
   wherein a display identifier of at least one historical live room and the first preset creation identifier of the at least one historical live room are displayed in a live room list page, and the live room list page is used for displaying a display identifier of the target live room and a second preset creation identifier associated with the target live room, wherein the second preset creation identifier is an interaction icon or an interaction button associated with the target live room.

2. The method according to claim 1, wherein acquiring, according to the trigger instruction, the live information associated with the first preset creation identifier comprises:
   acquiring cached live information of the historical live room;
   wherein in a case where a display identifier of the historical live room is displayed, the method further comprises: acquiring live information of the historical live room from the server and caching the live information of the historical live room.

3. The method according to claim 1, wherein after sending the live information to the server, the method further comprises:
   in a case where a notification of successful reception of the live information returned by the server is received, updating the live room list page;
   wherein the display identifier of the target live room and the second preset creation identifier associated with the target live room are displayed in the live room list page updated.

4. The method according to claim 3, wherein updating the live room list page comprises:
   adding the display identifier of the target live room to a blank position of the live room list page; or
   adding the display identifier of the target live room to a second associated position in the display region for the historical live room.

5. The method according to claim 4, wherein the display identifier of the target live room and the display identifier of the at least one historical live room comprise a same content.

6. The method according to claim 4, wherein updating the live room list page further comprises:
   displaying, at the second associated position of the display identifier of the target live room, the second preset creation identifier associated with the target live room.

7. The method according to claim 3, wherein after updating the live room list page, the method further comprises:
   in a case where a trigger instruction of the display identifier of the target live room is received, displaying a live interface.

8. The method according to claim 1, wherein the live information comprises at least one of: a name of the live room, a uniform resource locator (URL) of a cover image of the live room, a horizontal screen or a vertical screen, a live definition, and a live manner.

9. An electronic device, comprising:
   one or more processors; and
   a storage apparatus configured to store one or more programs;
   wherein the one or more programs, when executed by the one or more processors, cause the one or more processors to implement:
   receiving a trigger instruction of a first preset creation identifier;
   acquiring, according to the trigger instruction, live information associated with the first preset creation identifier; and
   sending live information to a server, wherein the live information is used for the server to create a target live room;
   wherein the first preset creation identifier is an interaction icon or an interaction button displayed at a first associated position in a display region for a historical live room;
   wherein the historical live room is a historically created live room; and
   wherein a display identifier of at least one historical live room and the first preset creation identifier of the at least one historical live room are displayed in a live room list page, and the live room list page is used for displaying a display identifier of the target live room and a second preset creation identifier associated with the target live room, wherein the second preset creation identifier is an interaction icon or an interaction button associated with the target live room.

10. The electronic device according to claim 9, wherein the one or more programs, when executed by the one or more processors, cause the one or more processors to implement:

acquiring cached live information of the historical live room;

wherein in a case where a display identifier of the historical live room is displayed, the method further comprises: acquiring live information of the historical live room from the server and caching the live information of the historical live room.

11. The electronic device according to claim 9, wherein the one or more programs, when executed by the one or more processors, cause the one or more processors to implement:

in a case where a notification of successful reception of the live information returned by the server is received, updating the live room list page;

wherein the display identifier of the target live room and the second preset creation identifier associated with the target live room are displayed in the live room list page updated.

12. The electronic device according to claim 11, wherein the one or more programs, when executed by the one or more processors, cause the one or more processors to implement:

adding the display identifier of the target live room to a blank position of the live room list page; or adding the display identifier of the target live room to a second associated position in the display region for the historical live room.

13. The electronic device according to claim 12, wherein the display identifier of the target live room and the display identifier of the at least one historical live room comprise a same content.

14. The electronic device according to claim 12, wherein the one or more programs, when executed by the one or more processors, cause the one or more processors to implement:

displaying, at the second associated position of the display identifier of the target live room, the second preset creation identifier associated with the target live room.

15. The electronic device according to claim 11, wherein the one or more programs, when executed by the one or more processors, cause the one or more processors to implement:

in a case where a trigger instruction of the display identifier of the target live room is received, displaying a live interface.

16. The electronic device according to claim 9, wherein the live information comprises at least one of: a name of the live room, a uniform resource locator (URL) of a cover image of the live room, a horizontal screen or a vertical screen, a live definition, and a live manner.

17. A non-transitory storage medium comprising computer-executable instructions which, when executed by a computer processor, are configured for performing:

receiving a trigger instruction of a first preset creation identifier;

acquiring, according to the trigger instruction, live information associated with the first preset creation identifier; and sending live information to a server, wherein the live information is used for the server to create a target live room;

wherein the first preset creation identifier is an interaction icon or an interaction button displayed at a first associated position in a display region for a historical live room;

wherein the historical live room is a historically created live room; and wherein a display identifier of at least one historical live room and the first preset creation identifier of the at least one historical live room are displayed in a live room list page, and the live room list page is used for displaying a display identifier of the target live room and a second preset creation identifier associated with the target live room, wherein the second preset creation identifier is an interaction icon or an interaction button associated with the target live room.

* * * * *